Oct. 16, 1934.　　　J. MORKOVSKI　　　1,977,523
TRACTOR BEET HARVESTER
Filed April 28, 1933　　2 Sheets-Sheet 1
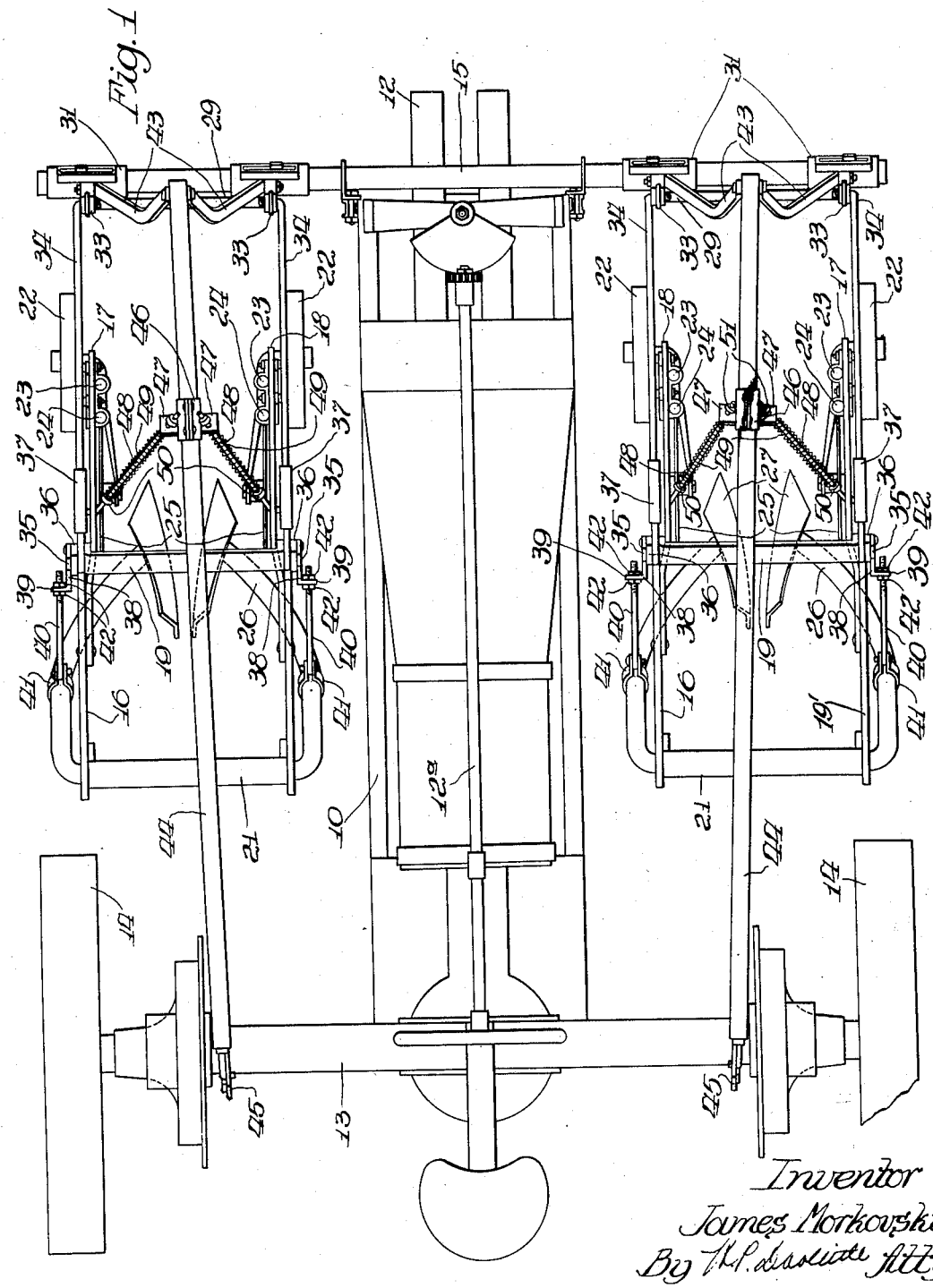

Oct. 16, 1934.  J. MORKOVSKI  1,977,523
TRACTOR BEET HARVESTER
Filed April 28, 1933  2 Sheets-Sheet 2
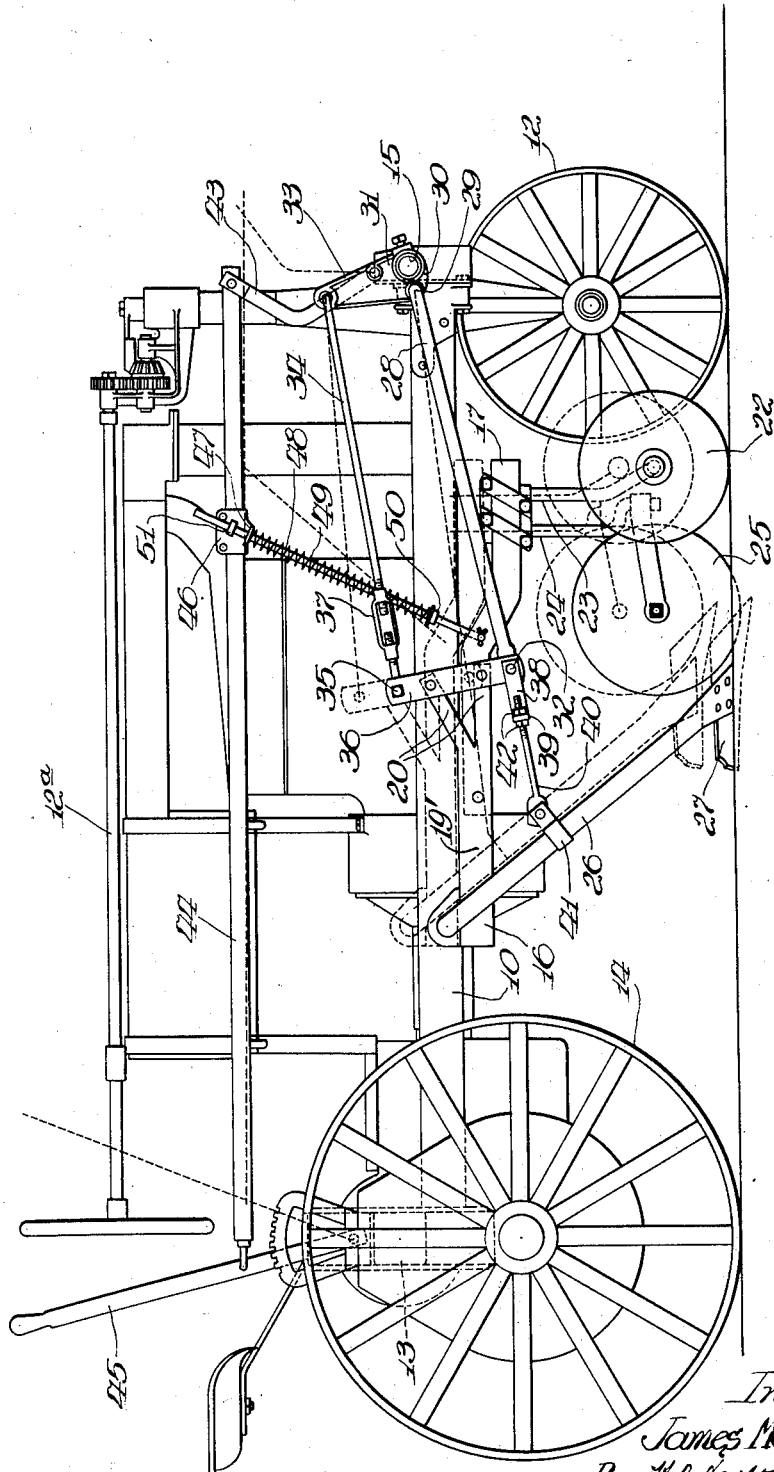

Patented Oct. 16, 1934

1,977,523

UNITED STATES PATENT OFFICE 1,977,523

TRACTOR BEET HARVESTER

James Morkovski, Canton, Ill., assignor to International Harvester Company, a corporation of New Jersey Application April 28, 1933, Serial No. 668,345

6 Claims. (Cl. 55—106)

The invention herein described relates to tractor propelled agricultural implements and more specifically to beet harvesting attachments for tractors.

The main objects of the invention are to provide a construction of beet harvesting means and a manner of connecting same to the tractor particularly adapted for location of one harvesting unit at each side of the body of a row crop or tricycle type tractor and to be so connected to supporting means on the tractor as to limit movement of the implement to vertical planes extending longitudinally of the tractor and maintain it in substantially level position during such movements.

These and other objects are attained by providing a narrow longitudinally extended frame of novel form for the beet harvesting means and by connecting this frame to the tractor through draft linkage and lifting and lowering means constructed and arranged to govern the movements of the implement, all as more specifically described and shown in the following specification and drawings, and defined in the claims.

In the drawings,

Figure 1 is a plan view of a tractor and beet harvester combination embodying the invention; and, Figure 2 is a side elevation of the same.

The invention is disclosed in connection with a row crop tractor of a well known type comprising a narrow longitudinally extending body portion 10 supported at the front on a steering truck 12 and at the rear on a transversely extended rear axle structure 13 carried on the traction wheels 14, which span a plurality of plant rows. A tractor of this type provides the space of one plant row between each side of the body and the tread line of the traction wheel on that side. The truck 12 has a vertical standard mounted in the front end of the tractor body which is connected by suitable gearing to a steering shaft 12$^a$ having the usual steering wheel adjacent the operator's station for guiding the tractor.

In the present instance a beet harvesting unit is located at each side of the body ahead of the traction wheel and within the space between the body and the wheel. The harvesting units are trailed from a transverse supporting member 15 mounted across the front end of the tractor body and projecting therebeyond at each side. One harvesting unit is connected to each of the projecting ends of the member 15. As the implements or units at each side of the tractor body are identical, only one of them will be described in detail.

Each beet harvesting implement comprises a narrow longitudinally extending horizontal frame 16 which is positioned in parallel relation to the tractor body. This frame preferably consists of side bars 17 and 18 connected together at their centers by a transversely and upwardly extending arched member 19, the depending arms of which are secured to the side members and braced by auxiliary bars 19' secured to the rear portions of the side members 17 and 18 and having forward split ends which are spread to provide brace arms 20 which are secured to the arms of the arched member 19. The arms of the arched member 19 extend below the side bars 17 and 18, as seen in Figure 2. At the rear end of the frame, the side bars of the frame 16 are connected by a tubular bearing member 21. The frame 16 is supported at its front end on gauge wheels 22 which are journaled on the lower ends of vertical standards 23 secured to the front ends of the side bars 17, 18 of the frame. Back of the standards 23, the side bars may have secured thereto the standards 24 for rolling colters 25. The bearing member 21 at the rear of the frame receives the inwardly bent ends of a pair of downwardly and forwardly extending tool standards 26, which converge beneath the frame where they are provided with complemental beet pulling blades 27 of any preferred type. The inclination of the tool standards 26 is such as to bring the beet digging blades into the space between the rolling colters 25, which cut away the vegetation at each side of the beet row.

The beet harvesting implement is connected to the transverse supporting member 15 on the tractor by means of a pair of draft links 28, one at each side of the frame. The draft links 28 are preferably formed as the rearwardly extending arms of a bail-shaped member, the transverse portion 29 of which is pivoted in bearings 30 on laterally spaced draft brackets 31 secured on the member 15. At their free ends the draft links 28 are pivoted to the lower ends of the arms of the transverse member 19, as at 32. The draft brackets 31 are formed with upright extensions or arms 33, and the upper ends of these arms have transverse pivot openings in which the forward ends of leveling links 34 are pivoted. The leveling links 34 are spaced or superposed immediately above the draft links 28 and are pivotally connected at their rear ends to the upper portions of the arms of the cross-member 19, as at 35. An outer strengthening bar or plate 36, coextensive with the arms of the arched bar 19, is preferably provided to lie over the pivot points of the draft links 28 and leveling links 34. The leveling links are each provided with a turn buckle connection at 37 by means of which the frame 16 may be adjusted or leveled in an obvious manner. The pivot bolts for the rear ends of the draft arms 28 at 32 are extended beyond the outer bar 36 and serve as the points of pivotal attachment for a rearwardly extending arm 38 which has an outwardly bent lug 39 apertured to receive the forward end of standard adjusting links 40, which are pivoted at their rear ends to collars 41 on the tool standards 26. The forward ends of the links 40 are threaded and adjustably held on the lugs 39 by opposite nuts 42.

With the construction so far described it will be evident that each implement or frame 16 will be capable of upward or floating movement as indicated in dotted lines on Figure 2, and that such movement will be confined within the vertical longitudinal planes between which the frame lies, the arrangement and connection of the links being such that lateral movement of the frame with respect to the tractor is prevented. Such guiding movements of the implements laterally as are necessary during operation are imparted thereto by steering movements of the tractor itself.

In order to provide for lifting and lowering of the beet harvesting implements the draft brackets 31 are provided with pivots for upwardly converging rock arms 43, the upper ends of which are pivotally connected to the forward end of a lifting shaft 44 extending to the rear of the tractor where it is connected to an adjusting lever 45 mounted on the rear axle structure adjacent the operator's station. Above the front portion of the implement frame the lifting shaft 44 has a collar 46 secured to it, which is formed with laterally extending, apertured ears 47 at each side of the shaft. These ears slidably receive the upper ends of lifting rods 48 which are connected at their lower ends to the respective side bars of the frame 16. The lifting rods 48 are provided with compression springs 49 which are confined between the ears 47 above and suitable abutments or stops 50 below. Adjustable stop nuts 51 threaded on the rods 48 above the ears 47 serve to pick up and lift the frame when the lifting shaft 44 is moved forwardly, and rearward movement of this shaft will serve to lower the implement and effect pressure on the springs 49.

The construction and arrangement above described will, therefore, provide an implement construction especially adapted to be in position at the sides of a row crop tractor and to be guided by movements of the tractor while capable of independent movement vertically. During such movement, the frame will be maintained in horizontal position and the digging tools will at all times be maintained at a predetermined operating depth by the gauge wheels 22.

While the preferred construction has been described, it is possible to vary this as to details without departure from the scope of the invention as defined in the following claims.

What is claimed is:

1. A beet digging attachment for tractors comprising a supporting member adapted to be mounted on a tractor in transverse relation thereto, draft links pivotally connected to the supporting member for vertical movement, a horizontally disposed frame similarly connected to the draft links, connecting means between said frame and support for maintaining said frame in substantially horizontal position during vertical movement, means on the supporting member for raising and lowering the frame, a pair of forwardly and downwardly inclined standards having their lower portions converging beneath the frame and their upper portions mounted thereon for adjustment of the lower portions of the standards vertically, beet digging means on the lower ends of the standards, and ground engaging means on the frame for maintaining the operating depth of said beet digging means when the frame is lowered.

2. A beet digging attachment for tractors comprising a supporting member adapted to be mounted on a tractor in transverse relation thereto, draft brackets secured to said member in laterally spaced relation, said brackets having vertically extended portions, draft links pivotally connected to said brackets for movement vertically, a horizontally disposed elongated frame pivotally connected intermediate its ends to the rear ends of said draft links and having members extended vertically from said pivotal connections, longitudinally adjustable leveling links pivotally connecting said extended members with the vertically extended portions of the draft brackets, ground engaging gauge wheels mounted on the frame forward of its connection with the draft links, and beet digging means mounted on the frame back of said connection.

3. A beet digging attachment for tractors comprising a supporting member adapted to be mounted on a tractor in transverse relation thereto, draft links pivotally connected to the supporting member for vertical movement and extending rearwardly therefrom, an elongated horizontally positioned frame structure including side bars pivotally connected between their ends to the draft links, ground wheels supporting the forward ends of said bars, a bearing member connecting the rear ends of said bars, a pair of forwardly and downwardly inclined standards having horizontal upper portions journaled in the bearing member and their lower ends converging beneath the frame, beet digging means mounted on the lower ends of said standards, and a link adjustably connecting each standard with the frame.

4. A beet digging attachment for tractors comprising a supporting member adapted to be mounted on a tractor in transverse relation thereto, draft links pivotally connected to the supporting member for vertical movement and extending rearwardly therefrom, an elongated horizontally positioned frame structure including side bars having upright arms secured thereto substantially midway between the ends of said side bars, pivotal connections between the draft links and the lower ends of said arms, adjustable leveling links spaced above the draft links and pivotally connecting the upper ends of said arms and the supporting member, ground wheels having supports secured to the forward ends of the side bars, a bearing member connecting the rear ends of said bars, a pair of forwardly and downwardly inclined standards having horizontal upper portions journaled in the bearing member and their lower ends converging beneath the frame, beet digging means mounted on the lower ends of said standards, and a link adjustably connecting each standard with the lower ends of the upright arms.

5. The combination with a row crop tractor having a narrow central body supported on rear traction wheels spaced laterally from the body to span the space of a plant row at each side of the body and a supporting member mounted on the front end of the body in transverse relation thereto and to project laterally thereof, of a beet digging implement located at the side of the body forward of the traction wheels comprising an elongated frame lying parallel to the tractor body and within the tread line of the traction wheel at that side of the tractor, and means for connecting said frame to the supporting member for vertical movement in the longitudinal planes within which the frame lies while maintaining said frame in substantially horizontal position and within said planes, comprising laterally spaced upright draft brackets on the supporting member and a pair of superposed links having transverse pivotal connections at vertically spaced points to each bracket and having similar pivotal connections with the opposite sides of the frame between the front and rear ends thereof.

6. The combination with a row crop tractor having a narrow central body supported on rear traction wheels spaced laterally from the body to span the space of a plant row at each side of the body and a supporting member mounted on the front end of the body in transverse relation thereto and to project laterally thereof, of a beet digging implement located at the side of the body forward of the traction wheels comprising an elongated frame lying parallel to the tractor body and within the tread line of the traction wheel at that side of the tractor, gauge wheels supporting the forward end of said frame, beet digging means supported on said frame back of said wheels, laterally spaced draft links pivotally connecting the frame and the supporting member on transverse horizontal axes for movement vertically, upright arms rockably mounted on the supporting member, a lifting shaft pivoted on said arms and extending rearwardly above said implement towards the rear of the tractor, and downwardly diverging lifting links connecting the intermediate portion of the implement frame with the lifting shaft.

JAMES MORKOVSKI.